US012482847B2

United States Patent
Suzuki et al.

(10) Patent No.: US 12,482,847 B2
(45) Date of Patent: Nov. 25, 2025

(54) METHOD FOR MANUFACTURING CELL

(71) Applicants: TOYOTA JIDOSHA KABUSHIKI KAISHA, Toyota (JP); Prime Planet Energy & Solutions, Inc., Tokyo (JP); Primearth EV Energy Co., Ltd., Kosai Shizuoka (JP)

(72) Inventors: Kentaro Suzuki, Kariya (JP); Koichi Tanimoto, Takarazuka (JP); Yuki Mizuno, Kosai (JP)

(73) Assignees: TOYOTA JIDOSHA KABUSHIKI KAISHA, Toyota (JP); PRIME PLANET ENERGY & SOLUTIONS, INC., Tokyo (JP); TOYOTA BATTERY CO., LTD., Kosai (JP)

( * ) Notice: Subject to any disclaimer, the term of this patent is extended or adjusted under 35 U.S.C. 154(b) by 517 days.

(21) Appl. No.: 17/985,198

(22) Filed: Nov. 11, 2022

(65) Prior Publication Data
US 2023/0197999 A1 Jun. 22, 2023

(30) Foreign Application Priority Data
Dec. 17, 2021 (JP) ................................ 2021-205250

(51) Int. Cl.
*H01M 10/04* (2006.01)
*H01M 50/169* (2021.01)
*H01M 50/636* (2021.01)

(52) U.S. Cl.
CPC ......... *H01M 10/04* (2013.01); *H01M 50/169* (2021.01); *H01M 50/636* (2021.01)

(58) Field of Classification Search
CPC ... H01M 10/04; H01M 50/636; H01M 50/169
See application file for complete search history.

(56) References Cited

U.S. PATENT DOCUMENTS

2010/0078413 A1  4/2010 Hosokawa et al.
2018/0006276 A1* 1/2018 Kambayashi ....... H01M 50/169

FOREIGN PATENT DOCUMENTS

| JP | 2010-105041 A | 5/2010 |
| JP | 2014-127400 A | 7/2014 |
| JP | 2020017357 A * | 1/2020 |

* cited by examiner

*Primary Examiner* — Basia A Ridley
*Assistant Examiner* — Heng M. Chan
(74) *Attorney, Agent, or Firm* — Dinsmore & Shohl LLP

(57) ABSTRACT

A method for manufacturing a cell includes the steps of: preparing a housing portion having an opening; preparing a lid portion that includes a plate portion, a first external terminal located on the plate portion, and a second external terminal located on the plate portion at a position away from the first external terminal; placing the lid portion in the housing portion in such a manner that the plate portion closes the opening; placing a jig on an inter-terminal region of the plate portion that is located between the first external terminal and the second external terminal; and sealing the opening by joining the plate portion with the jig placed thereon and the housing portion together by welding.

3 Claims, 8 Drawing Sheets

METHOD FOR MANUFACTURING CELL

CROSS-REFERENCE TO RELATED APPLICATION

This application claims priority to Japanese Patent Application No. 2021-205250 filed on Dec. 17, 2021, incorporated herein by reference in its entirety.

BACKGROUND

1. Technical Field

The present disclosure relates to methods for manufacturing a cell.

2. Description of Related Art

Japanese Unexamined Patent Application Publication No. 2010-105041 (JP 2010-105041 A) discloses a method for manufacturing a cell. JP 2010-105041 A describes a method for manufacturing a rectangular cell in which a sealing lid is fitted into an opening of a rectangular cell outer can and laser welding is performed on a welding portion between the rectangular cell outer can and the sealing lid. JP 2010-105041 A also describes that a positive electrode terminal and a negative electrode terminal are attached to the sealing lid via an insulator.

SUMMARY

In the conventional method for manufacturing a cell, the welding portion between the outer can (housing portion) and the sealing lid is sometimes welded with the two terminals attached to the sealing lid. In such a case, welding heat is conducted to an inter-terminal region of the sealing lid that is located between the two terminals. As a result, the temperature of the inter-terminal region rises, so that the inter-terminal region softens and deforms, and the separation distance between the two terminals changes.

The present disclosure provides a method for manufacturing a cell that can reduce a change in separation distance between two external terminals due to deformation of an inter-terminal region during welding of a lid portion and a housing portion.

One aspect of the present disclosure provides a method for manufacturing a cell. The method for manufacturing a cell includes the steps of: preparing a housing portion having an opening; preparing a lid portion that includes a plate portion, a first external terminal located on the plate portion, and a second external terminal located on the plate portion at a position away from the first external terminal; placing the lid portion in the housing portion in such a manner that the plate portion closes the opening; placing a jig on an inter-terminal region of the plate portion that is located between the first external terminal and the second external terminal; and sealing the opening by joining the plate portion with the jig placed thereon and the housing portion together by welding.

In the step of sealing the opening by joining the plate portion of the lid portion and the housing portion together by welding, heat conducted to the inter-terminal region during the welding is conducted to the jig. This can reduce a temperature rise of the inter-terminal region and thus can reduce softening and bending deformation of the inter-terminal region. Since deformation of the inter-terminal region is reduced, a change in separation distance between the first external terminal and the second external terminal due to deformation of the inter-terminal region can be reduced.

In the method of the above aspect, in the step of placing the jig, the jig may be placed so as to abut on each of the first external terminal and the second external terminal.

The jig can eliminate or reduce the possibility of the first external terminal and the second external terminal getting closer to each other due to deformation of the inter-terminal region. This can reduce a decrease in separation distance between the first external terminal and the second external terminal.

In the method of the above aspect, in the step of preparing the lid portion, the lid portion that is prepared may further include a first resin member provided so as to electrically insulate the plate portion and the first external terminal from each other, and a second resin member provided so as to electrically insulate the plate portion and the second external terminal from each other. The first external terminal may include a first side surface facing the second external terminal side. The first resin member may include a first outer edge portion located at least on the second external terminal side with respect to the first side surface. The second external terminal may include a second side surface facing the first external terminal side. The second resin member may include a second outer edge portion located at least on the first external terminal side with respect to the second side surface. In the step of placing the jig, the jig may include a base portion, a first protruding portion protruding from the base portion, a second protruding portion protruding from the base portion on an opposite side from the first protruding portion, and a third protruding portion protruding from a part of the base portion that is different from the first protruding portion and the second protruding portion. In the step of placing the jig, the jig may be placed in such a manner that the first protruding portion abuts on the first side surface, the second protruding portion abuts on the second side surface, and the third protruding portion contacts the inter-terminal region while being separated from each of the first outer edge portion and the second outer edge portion.

When the inter-terminal region is deformed, the first resin member and the second resin member also tend to be displaced in the direction in which the first resin member and the second resin member get closer to each other. At this time, the above configuration can restrain the pressing force that is applied from the jig to the first external terminal and the second external terminal from being reduced due to the jig pressing the first resin member and the second resin member. As a result, a decrease in separation distance between the first external terminal and the second external terminal can further be reduced.

In the method of the above aspect, in the step of preparing the lid portion, the plate portion of the lid portion that is prepared may further include a liquid injection port. In the step of placing the jig, the jig may be placed so as to close the liquid injection port.

As a result, in the step of sealing the opening by joining the plate portion of the lid portion and the housing portion together by welding, spatter generated during the welding is less likely to enter the cell through the liquid injection port.

In the method of the above aspect, in the step of placing the jig, the jig may be placed so as to be located away from a boundary between the plate portion and the housing portion.

Accordingly, in the step of sealing the opening by joining the plate portion of the lid portion and the housing portion together by welding, penetration of the housing portion into the plate portion is less likely to be inhibited by the jig.

According to the present disclosure, a change in separation distance between the first external terminal and the second external terminal due to deformation of the inter-terminal region during welding can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a cell and a method for manufacturing the same according to an embodiment of the present disclosure will be described with reference to the drawings. In the following description of the embodiment, the same or corresponding portions are denoted by the same signs throughout the drawings, and description thereof will not be repeated.

Figure 1:
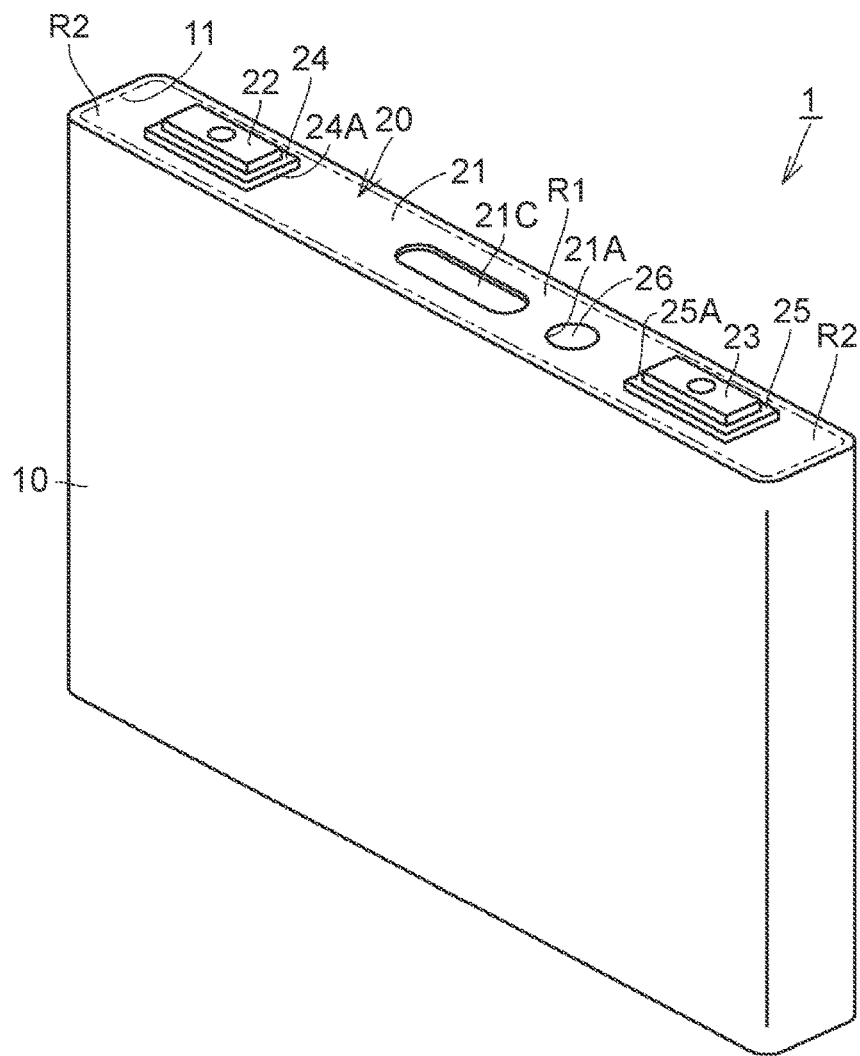
FIG. 1 is a perspective view of a cell according to an embodiment.

FIG. 1 is a perspective view of a cell according to an embodiment. As shown in FIG. 1, a cell 1 is specifically an energy storage cell and has a rectangular shape. The cell 1 is a secondary battery such as a nickel metal hydride battery or a lithium-ion battery. A plurality of cells 1 may be connected to each other via a bus bar to provide an energy storage module. Such an energy storage module is mounted on a hybrid electric vehicle capable of traveling using the power of either or both of a motor and an engine, or an electrified vehicle that travels with a driving force obtained from electrical energy. The energy storage module may be mounted below a floor panel of a vehicle, or may be placed between the floor panel and a seat.

Figure 2:
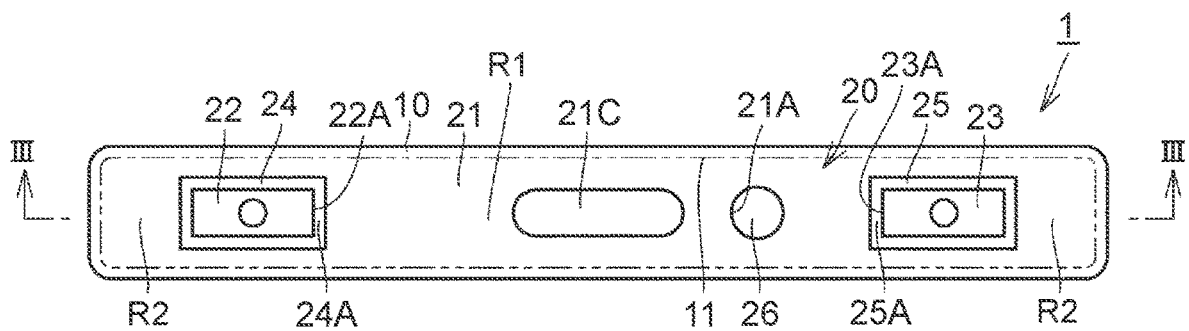
FIG. 2 is a plan view of the cell according to the embodiment.
Figure 3:
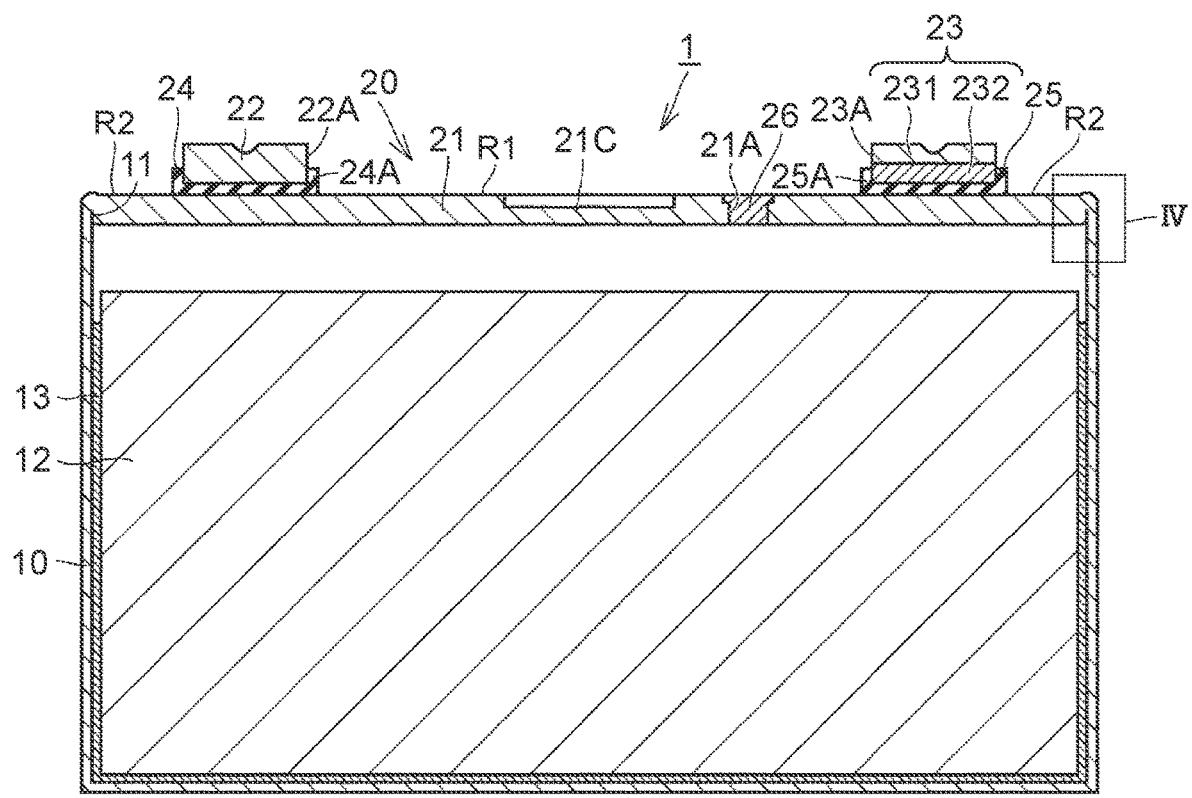
FIG. 3 is a schematic sectional view of the cell of FIG. 2 as viewed in the direction of arrow line III-III in FIG. 2.

FIG. 2 is a plan view of the cell according to the embodiment. FIG. 3 is a schematic sectional view of the cell of FIG. 2 as viewed in the direction of arrow line in FIG. 2. As shown in FIGS. 1 to 3, the cell 1 includes a housing portion 10 and a lid portion 20.

The housing portion 10 has an opening 11, but the opening 11 is sealed in a manner that will be described later. The housing portion 10 contains a battery element 12 and an electrolyte solution 13. The housing portion 10 is made of, for example, an aluminum alloy.

The lid portion 20 includes a plate portion 21, a first external terminal 22 located on the plate portion 21, and a second external terminal 23 located on the plate portion 21 at a position away from the first external terminal 22. The plate portion 21 has an inter-terminal region R1 between the first external terminal 22 and the second external terminal 23. The plate portion 21 further has outer regions R2 on the opposite side of the first external terminal 22 from the inter-terminal region R1 and on the opposite side of the second external terminal 23 from the inter-terminal region R1.

The plate portion 21 has a liquid injection port 21A and a safety valve 21C. The liquid injection port 21A extends through the plate portion 21. Specifically, the liquid injection port 21A is located in the inter-terminal region R1. The safety valve 21C is located substantially in the middle of the plate portion 21, more specifically substantially in the middle of the inter-terminal region R1, as viewed from the opening direction of the opening 11 of the housing portion 10. The safety valve 21C is the thinnest part of the plate portion 21. The plate portion 21 may be made of a single metal, but the safety valve 21C may be made of a member different from the remaining part of the plate portion 21. In the present embodiment, the plate portion 21 is made of, for example, an aluminum alloy.

The first external terminal 22 is, for example, a positive electrode terminal, and is connected to a positive electrode of the battery element 12 by a current collecting member, not shown. The first external terminal 22 is made of metal. For example, the first external terminal 22 is made of an aluminum alloy. The first external terminal 22 has a first side surface 22A facing the second external terminal 23 side.

The second external terminal 23 is, for example, a negative electrode terminal, and is connected to a negative electrode of the battery element 12 by a current collecting member, not shown. The second external terminal 23 is made of metal. Specifically, the second external terminal 23 has a first metal portion 231 and a second metal portion 232 that are made of different metals from each other. The first metal portion 231 is made of, for example, a copper alloy, and the second metal portion 232 is made of, for example, an aluminum alloy. The second metal portion 232 is located on the plate portion 21 side of the first metal portion 231. The second external terminal 23 has a second side surface 23A facing the first external terminal 22 side.

The lid portion 20 further includes a first resin member 24, a second resin member 25, and a plug portion 26. The first resin member 24 is provided so as to electrically insulate the plate portion 21 and the first external terminal 22 from each other. The first resin member 24 includes a first outer edge portion 24A located at least on the second external terminal 23 side with respect to the first side surface 22A. The second resin member 25 is provided so as to electrically insulate the plate portion 21 and the second external terminal 23 from each other. The second resin member 25 includes a second outer edge portion 25A located at least on the first external terminal 22 side with respect to the second side surface 23A. The plug portion 26 seals the liquid injection port 21A.

Figure 4:
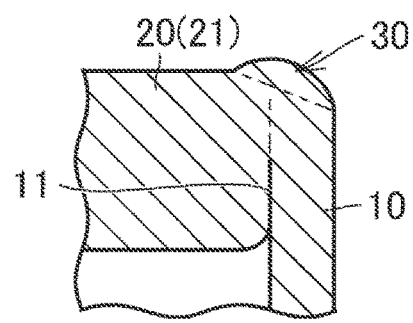
FIG. 4 is a partial sectional view showing the configuration of a region IV in FIG. 3.

FIG. 4 is a partial sectional view showing the configuration of a region IV in FIG. 3. As shown in FIG. 4, the cell 1 according to the present embodiment further has a penetration portion 30. The penetration portion 30 joins the housing portion 10 and the lid portion 20 together. The penetration portion 30 is formed as a part of the housing portion 10 and a part of the lid portion 20 melt and penetrate each other by welding performed in a method for manufacturing the cell 1 that will be described later. The penetration portion 30 is located so as to overlap both the housing portion 10 and the lid portion 20 as viewed from the opening direction of the opening 11 of the housing portion 10.

Figure 5:
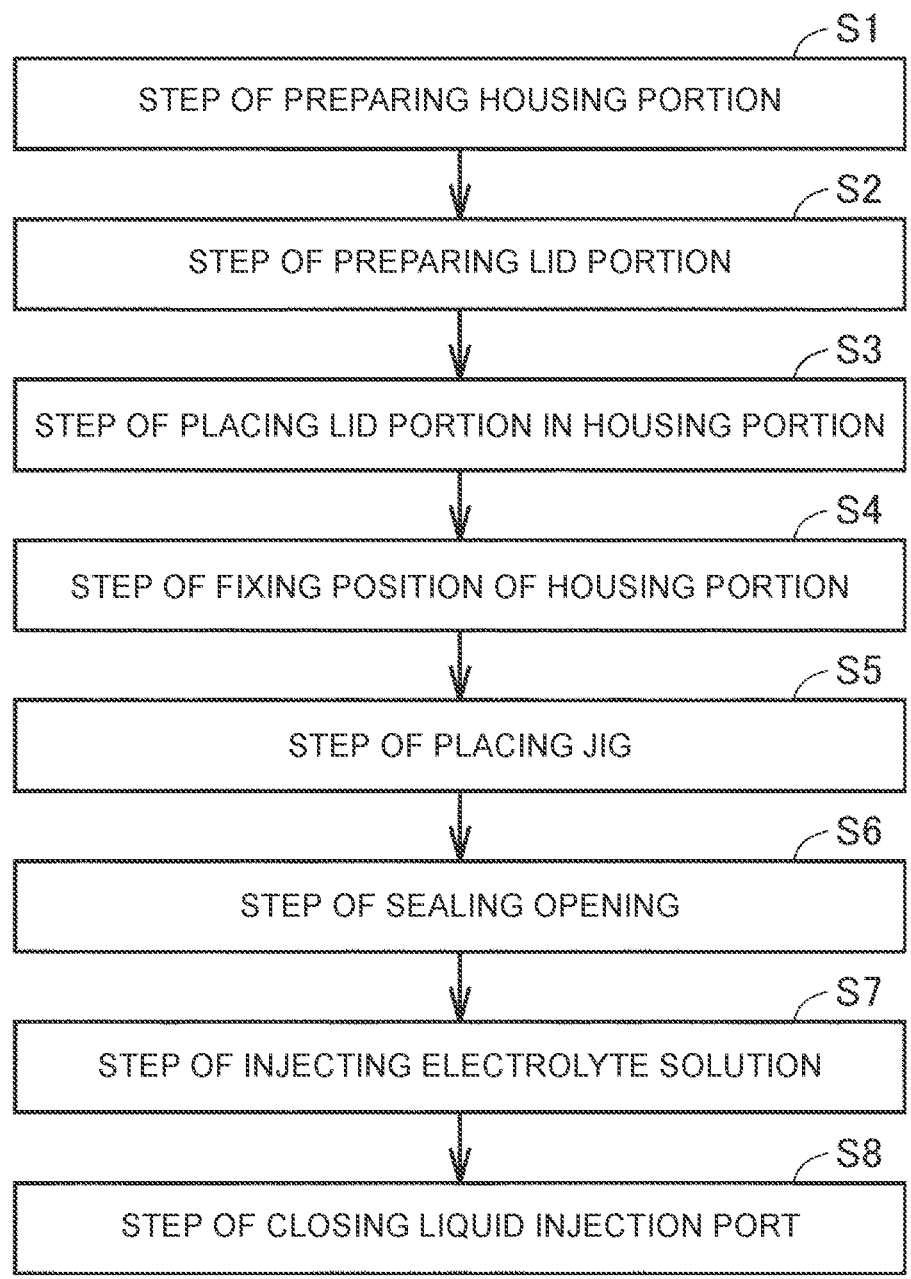
FIG. 5 is a flowchart of a method for manufacturing a cell according to the embodiment.

Next, a method for manufacturing the cell 1 according to the embodiment of the present disclosure will be described. FIG. 5 is a flowchart of the method for manufacturing the cell 1 according to the embodiment. As shown in FIG. 5, the method for manufacturing the cell 1 according to the embodiment includes: the step S1 of preparing a housing portion; the step S2 of preparing a lid portion; the step S3 of placing the lid portion in the housing portion; the step S4 of fixing the position of the housing portion; the step S5 of placing a jig; the step S6 of sealing an opening; the step S7 of injecting an electrolyte solution; and the step S8 of closing a liquid injection port. The method for manufacturing the cell 1 according to the present embodiment need not necessarily include the steps S1 to S5 in this order.

Figure 6:
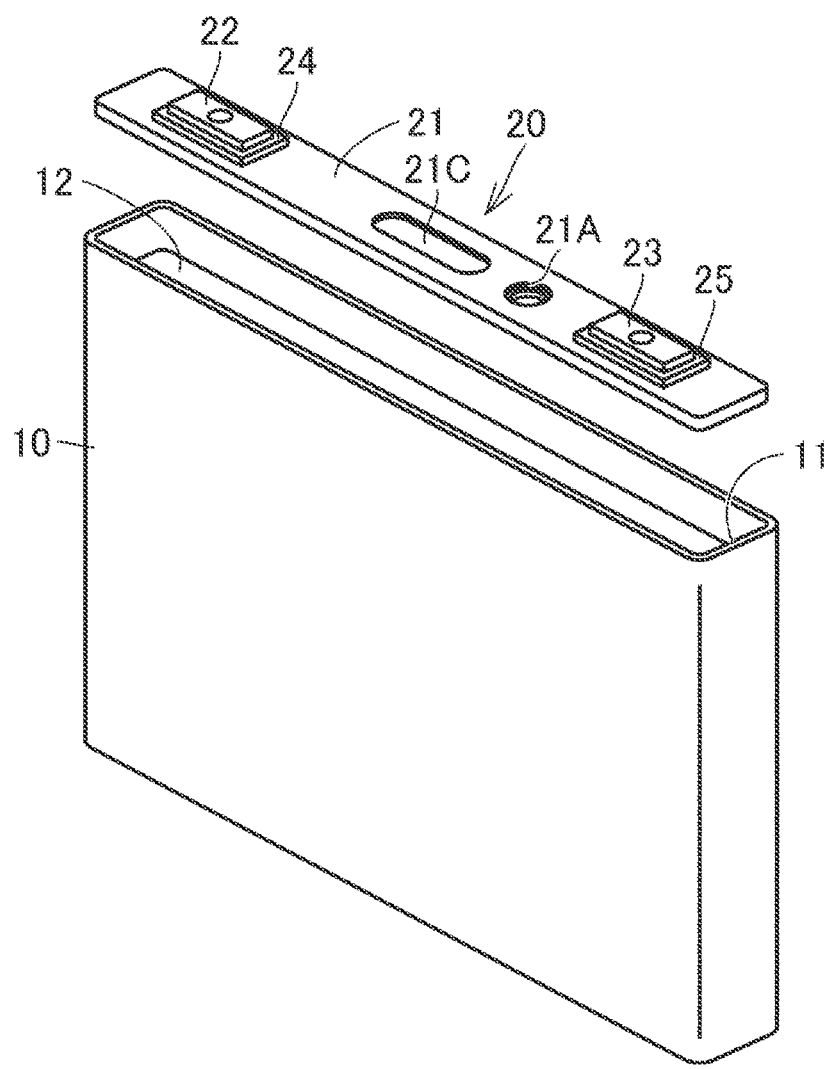
FIG. 6 is a perspective view of a housing portion and a lid portion that are prepared in the method for manufacturing a cell according to the embodiment.

FIG. 6 is a perspective view of a housing portion and a lid portion that are prepared in the method for manufacturing the cell 1 according to the embodiment. As shown in FIG. 6, the housing portion 10 prepared in the step S1 of preparing a housing portion has the opening 11 and contains the battery element 12, but does not yet contain the electrolyte solution 13.

The lid portion 20 that is prepared in the step S2 of preparing a lid portion has the plate portion 21, the first external terminal 22, the second external terminal 23, the first resin member 24, and the second resin member 25 that are described above, but does not yet have the plug portion 26 described above. The plate portion 21 of the prepared lid portion 20 further has the liquid injection port 21A and the safety valve 21C.

Figure 7:
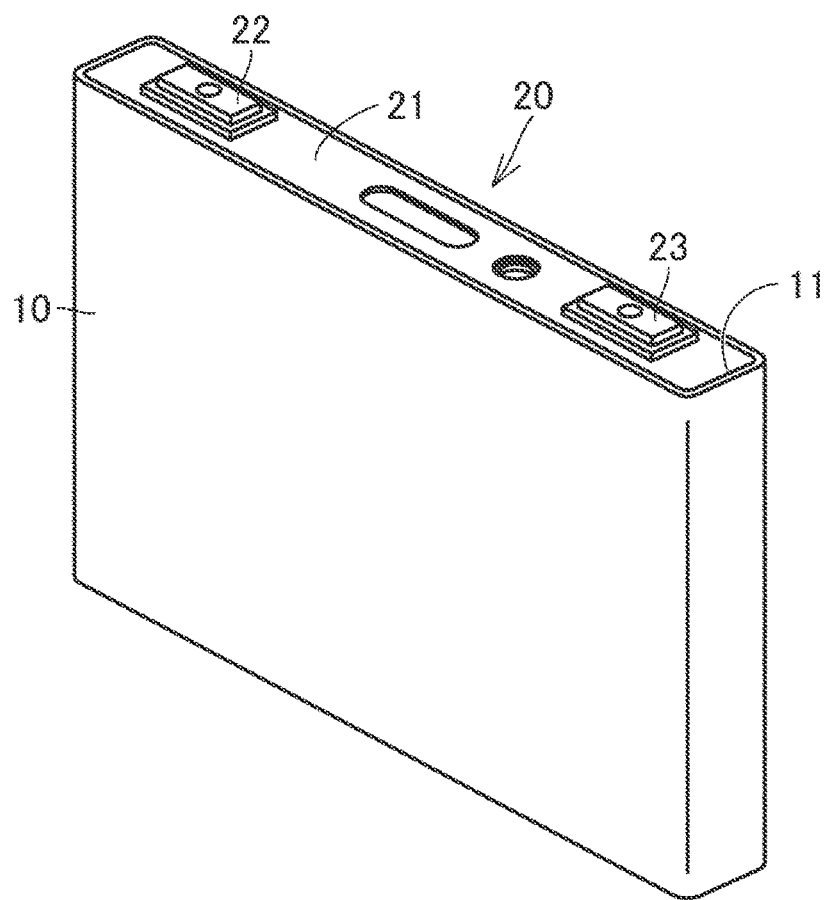
FIG. 7 is a perspective view of the housing portion with the lid portion placed therein in the method for manufacturing a cell according to the embodiment.

FIG. 7 is a perspective view of the housing portion with the lid portion placed therein in the method for manufacturing the cell 1 according to the embodiment. As shown in FIG. 7, in the step S3 of placing the lid portion in the housing portion, the lid portion 20 is placed such that the plate portion 21 closes the opening 11. Specifically, by fitting the plate portion 21 in the opening 11, the lid portion 20 is placed such that the outer peripheral edge of the plate portion 21 as viewed from the side on which the first external terminal 22 and the second external terminal 23 are provided contacts the housing portion 10.

Figure 8:
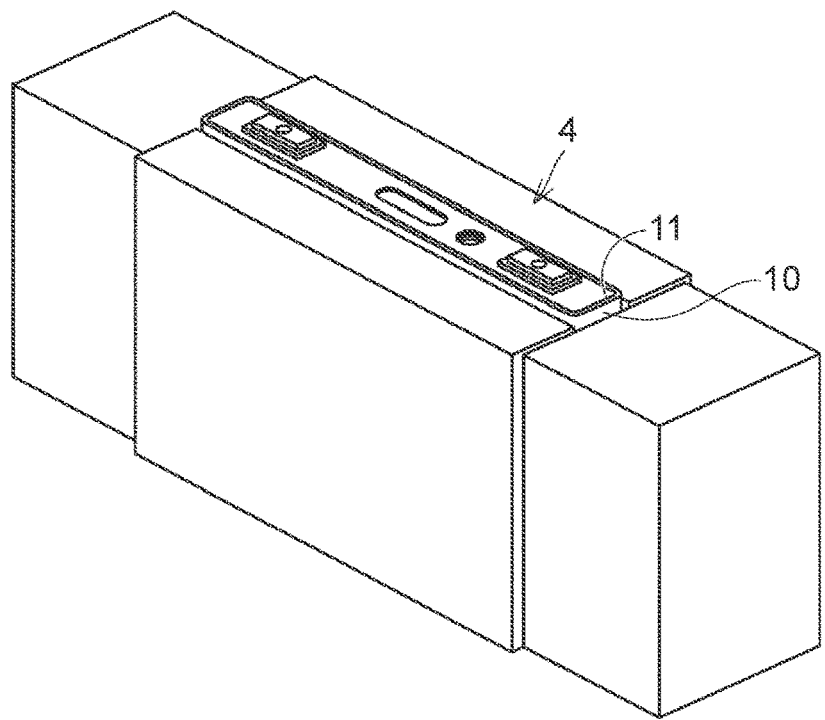
FIG. 8 is a perspective view of the housing portion whose position is fixed and the lid portion in the method for manufacturing a cell according to the embodiment.

FIG. 8 is a perspective view of the housing portion whose position is fixed and the lid portion in the method for manufacturing the cell 1 according to the embodiment. As shown in FIG. 8, in the step S4 of fixing the position of the housing portion, the housing portion 10 is fixed by a fixing device 4. More specifically, the housing portion 10 is fixed such that the fixing device 4 surrounds the housing portion 10 as viewed from the opening direction of the opening 11 of the housing portion 10. The opening direction of the opening 11 of the housing portion 10 when the housing portion 10 is thus fixed is an upward direction. However, this opening direction is not particularly limited.

Figure 9:
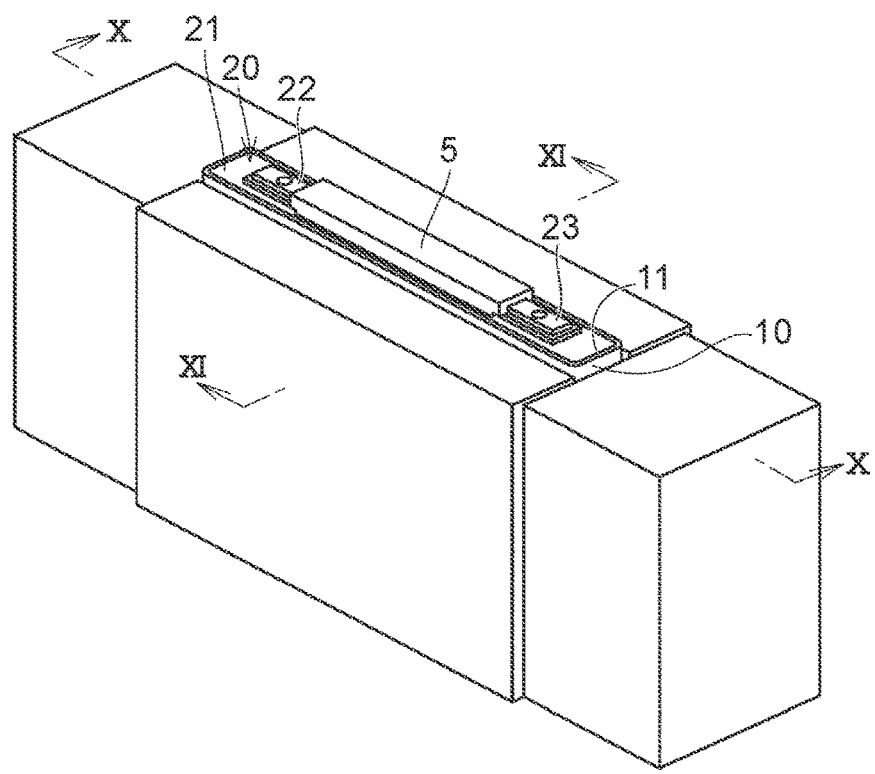
FIG. 9 is a perspective view of the housing portion and the lid portion with a jig placed on an inter-terminal region in the method for manufacturing a cell according to the embodiment.
Figure 10:
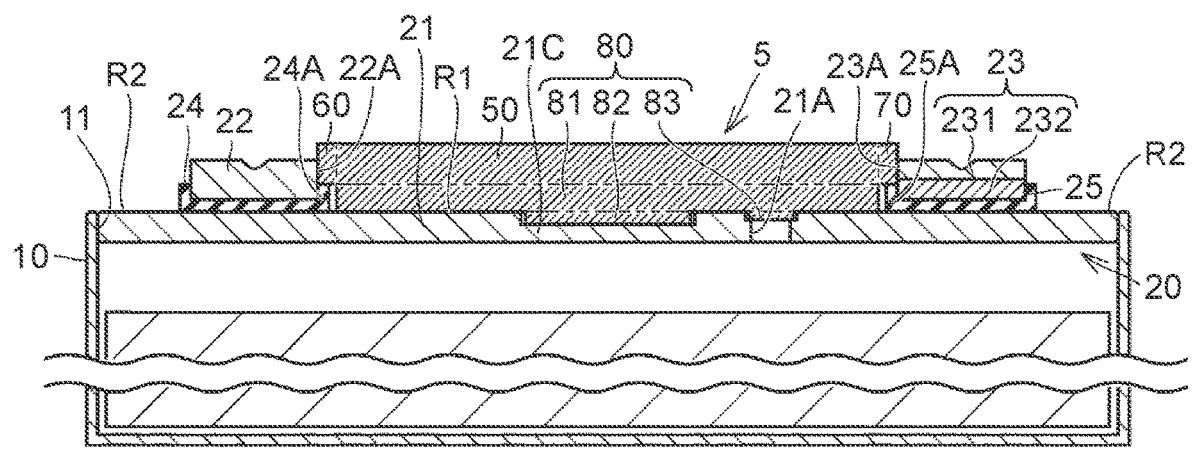
FIG. 10 is a partial sectional view of the housing portion, the lid portion, and the jig of FIG. 9 as viewed in the direction of arrow line X-X in FIG. 9.
Figure 11:
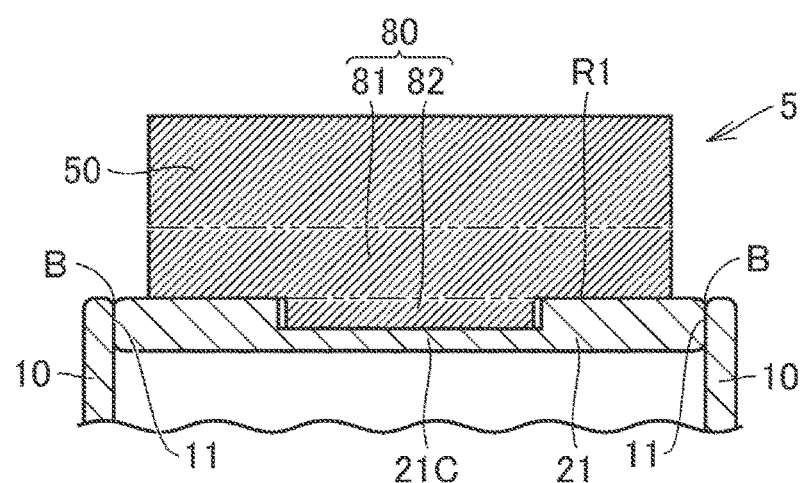
FIG. 11 is a partial sectional view of the housing portion, the lid portion, and the jig of FIG. 9 as viewed in the direction of arrow line XI-XI in FIG. 9.

FIG. 9 is a perspective view of the housing portion and the lid portion with a jig placed on an inter-terminal region in the method for manufacturing the cell 1 according to the embodiment. FIG. 10 is a partial sectional view of the housing portion, the lid portion, and the jig of FIG. 9 as viewed in the direction of arrow line X-X in FIG. 9. FIG. 11 is a partial sectional view of the housing portion, the lid portion, and the jig of FIG. 9 as viewed in the direction of arrow line XI-XI in FIG. 9. As shown in FIGS. 9 to 11, in the step S5 of placing a jig, a jig 5 is placed on the inter-terminal region R1 of the plate portion 21 that is located between the first external terminal 22 and the second external terminal 23. The jig 5 is placed on the inter-terminal region R1 from, for example, a direction along the opening direction of the opening 11. However, this direction is not particularly limited.

The jig 5 will be described. The jig 5 includes: a base portion 50; a first protruding portion 60 protruding from the base portion 50; a second protruding portion 70 protruding from the base portion 50 on the opposite side from the first protruding portion 60; and a third protruding portion 80 protruding from a part of the base portion 50 that is different from the first protruding portion 60 and the second protruding portion 70. The third protruding portion 80 includes a main abutting portion 81, a sub-abutting portion 82, and a closing portion 83. The main abutting portion 81 is a portion protruding from the base portion 50. The sub-abutting portion 82 and the closing portion 83 are portions further protruding from the main abutting portion 81, and are located on the opposite side of the main abutting portion 81 from the base portion 50. The sub-abutting portion 82 and the closing portion 83 are located apart from each other. In some embodiments, the jig 5 is made of metal. For example, the jig 5 is made of stainless steel or an aluminum alloy.

Specifically, the jig 5 is placed so as to abut on each of the first external terminal 22 and the second external terminal 23. More specifically, the jig 5 is placed such that the first protruding portion 60 abuts on the first side surface 22A, the second protruding portion 70 abuts on the second side surface 23A, and the third protruding portion 80 contacts the inter-terminal region R1 while being separated from each of the first outer edge portion 24A and the second outer edge portion 25A. At this time, the second protruding portion 70 abuts on the second side surface 23A of both the first metal portion 231 and the second metal portion 232.

The jig 5 is also placed on the inter-terminal region R1 such that the third protruding portion 80 abuts on the safety valve 21C, and is placed so as to close the liquid injection port 21A. Specifically, the jig 5 is placed such that the main abutting portion 81 abuts on the portion of the inter-terminal region R1 of the plate portion 21 other than the plug portion 26 and the safety valve 21C, the sub-abutting portion 82 abuts on the safety valve 21C, and the closing portion 83 closes the plug portion 26.

The jig 5 is placed on the plate portion 21 so as to be located away from a boundary B between the plate portion 21 and the housing portion 10. Specifically, the jig 5 is placed such that the third protruding portion 80 is located away from the boundary B. More specifically, the jig 5 is placed such that the main abutting portion 81 is located away from the boundary B.

Figure 12:
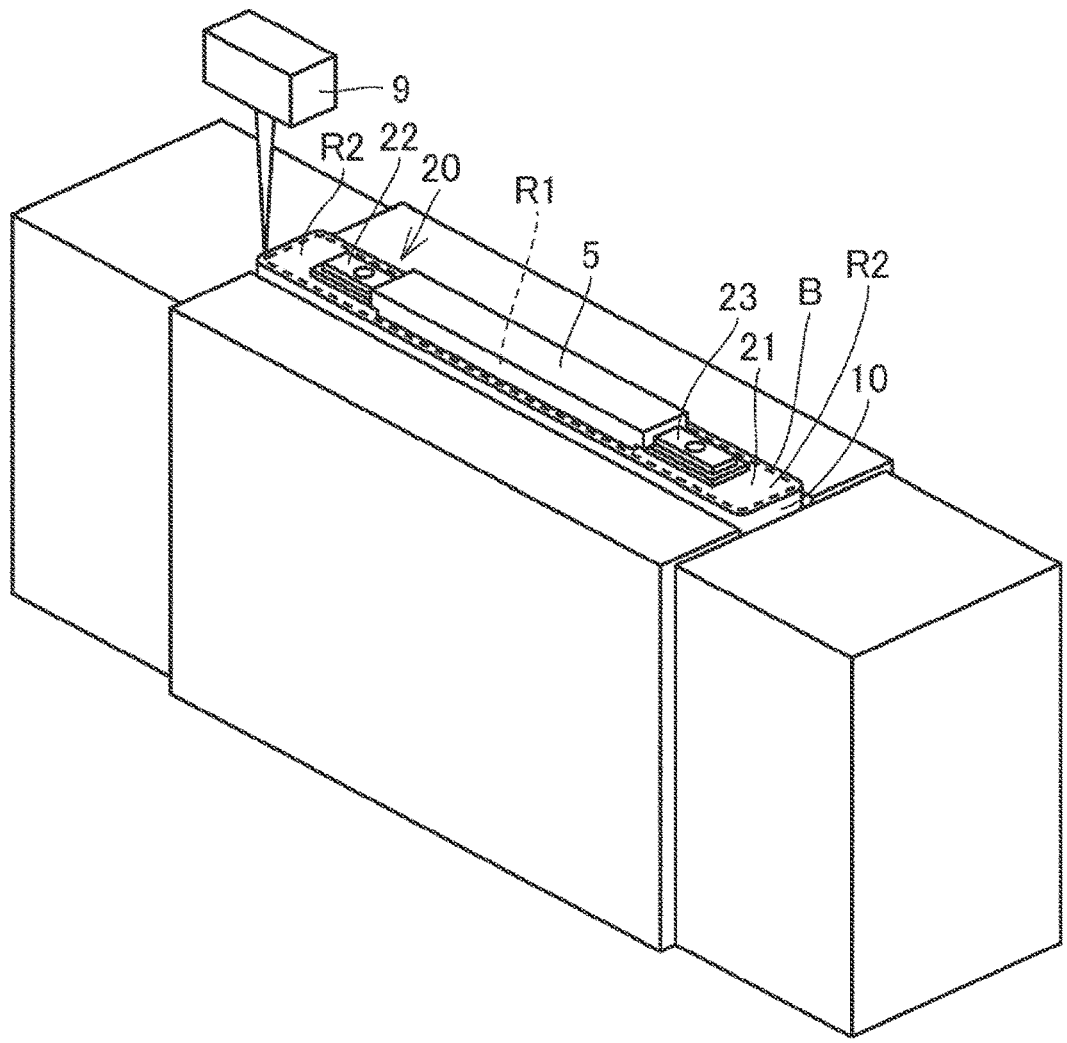
FIG. 12 is a perspective view of the lid portion, the housing portion, and the jig when sealing an opening in the method for manufacturing a cell according to the embodiment.

FIG. 12 is a perspective view of the lid portion, the housing portion, and the jig when sealing the opening in the method for manufacturing the cell 1 according to the embodiment. As shown in FIGS. 9 to 12, in the step S6 of sealing an opening, the plate portion 21 with the jig 5 placed thereon and the housing portion 10 are joined together by welding to seal the opening 11. Specifically, this welding is laser welding in which a laser beam is emitted from a laser emitter 9. Heat conducted to the inter-terminal region R1 during the welding is conducted to the jig 5. This can reduce a temperature rise of the inter-terminal region R1 and thus can reduce softening and bending deformation of the inter-terminal region R1. Since deformation of the inter-terminal region R1 is reduced, a change in separation distance between the first external terminal 22 and the second external terminal 23 due to deformation of the inter-terminal region R1 can be reduced.

In the present embodiment, the length of the inter-terminal region R1 is longer than the length of each of the outer regions R2 in the direction in which the first external terminal 22 and the second external terminal 23 are arranged. The laser welding path at the boundary B around the inter-terminal region R1 is therefore relatively longer than the laser welding path at the boundary B around each of the outer regions R2. Accordingly, if welding is performed without placing the jig 5, the amount of heat input to the inter-terminal region R1 due to the laser heat is larger than the amount of heat input to each of the outer regions R2 due to the laser heat. As a result, the inter-terminal region R1 is more likely to be bent and deformed due to a temperature rise than the outer regions R2. However, by placing the jig 5, heat is conducted from the inter-terminal region R1 to the jig 5. This reduces thermal deformation of the inter-terminal region R1 that is relatively susceptible to welding heat.

Moreover, since the jig 5, specifically the third protruding portion 80, more specifically the sub-abutting portion 82, abuts on the safety valve 21C, heat conducted to the safety valve 21C of the plate portion 21 during the welding is further conducted to the jig 5. This configuration reduces a temperature rise of the safety valve 21C and thus reduces softening of the safety valve 21C. A decrease in strength of the safety valve 21C is thus reduced.

Moreover, as shown in FIG. 11, the jig 5 is placed so as to be located away from the boundary B between the plate portion 21 and the housing portion 10. Penetration of the housing portion 10 into the plate portion 21 is therefore less likely to be inhibited by the jig 5. Formation of such a penetration portion 30 as shown in FIG. 4 is therefore less likely to be inhibited.

In the step S7 of injecting an electrolyte solution, the electrolyte solution 13 described above is injected through the liquid injection port 21A. In the step S8 of closing a liquid injection port, the liquid injection port 21A is closed by the plug portion 26 described above. The cell 1 according to the present embodiment shown in FIGS. 1 to 4 is thus manufactured.

As described above, the method for manufacturing the cell 1 according to the present embodiment includes: the step S1 of preparing the housing portion 10 having the opening 11; the step S2 of preparing the lid portion 20 that includes the plate portion 21, the first external terminal 22 located on the plate portion 21, and the second external terminal 23 located on the plate portion 21 at a position away from the first external terminal 22; the step S3 of placing the lid portion 20 in the housing portion 10 in such a manner that the plate portion 21 closes the opening 11; the step S5 of placing the jig 5 on the inter-terminal region R1 of the plate portion 21 that is located between the first external terminal 22 and the second external terminal 23; and the step S6 of sealing the opening 11 by joining the plate portion 21 with the jig 5 placed thereon and the housing portion 10 together by welding.

In the step S6 of sealing the opening 11 by joining the plate portion 21 of the lid portion 20 and the housing portion 10 together by welding, heat conducted to the inter-terminal region R1 during the welding is conducted to the jig 5. This can reduce a temperature rise of the inter-terminal region R1 and thus can reduce softening and bending deformation of the inter-terminal region R1. Since deformation of the inter-terminal region R1 is reduced, a change in separation distance between the first external terminal 22 and the second external terminal 23 due to deformation of the inter-terminal region R1 can be reduced.

In the method for manufacturing the cell 1 according to the present embodiment, in the step S5 of placing the jig 5, the jig 5 is placed so as to abut on each of the first external terminal 22 and the second external terminal 23.

The jig 5 can eliminate or reduce the possibility of the first external terminal 22 and the second external terminal 23 getting closer to each other due to deformation of the inter-terminal region R1. This can reduce a decrease in separation distance between the first external terminal 22 and the second external terminal 23.

In the method for manufacturing the cell 1 according to the present embodiment, in the step S5 of placing the jig 5, the jig 5 includes: the base portion 50; the first protruding portion 60 protruding from the base portion 50; the second protruding portion 70 protruding from the base portion 50 on the opposite side from the first protruding portion 60; and the third protruding portion 80 protruding from a part of the base portion 50 that is different from the first protruding portion 60 and the second protruding portion 70. In the step S5 of placing the jig 5, the jig 5 is placed such that the first protruding portion 60 abuts on the first side surface 22A, the second protruding portion 70 abuts on the second side surface 23A, and the third protruding portion 80 contacts the inter-terminal region R1 while being separated from each of the first outer edge portion 24A and the second outer edge portion 25A.

When the inter-terminal region R1 is deformed, the first resin member 24 and the second resin member 25 also tend to be displaced in the direction in which the first resin member 24 and the second resin member 25 get closer to each other. At this time, the above configuration can restrain the pressing force that is applied from the jig 5 to the first external terminal 22 and the second external terminal 23 from being reduced due to the jig 5 pressing the first resin member 24 and the second resin member 25. As a result, a decrease in separation distance between the first external terminal 22 and the second external terminal 23 can further be reduced.

In the method for manufacturing the cell 1 according to the present embodiment, in the step S2 of preparing the lid portion 20, the lid portion 20 that is prepared has the plate portion 21 further having the liquid injection port 21A. In the step S5 of placing the jig 5, the jig 5 is placed so as to close the liquid injection port 21A.

As a result, in the step S6 of sealing the opening 11 by joining the plate portion 21 of the lid portion 20 and the housing portion 10 together by welding, the spatter generated during the welding is less likely to enter the cell 1 through the liquid injection port 21A.

In the method for manufacturing the cell 1 according to the present embodiment, in the step S5 of placing the jig 5, the jig 5 is placed so as to be located away from the boundary B between the plate portion 21 and the housing portion 10.

Accordingly, in the step S6 of sealing the opening 11 by joining the plate portion 21 of the lid portion 20 and the housing portion 10 together by welding, penetration of the housing portion 10 into the plate portion 21 is less likely to be inhibited by the jig 5.

Figure 13:
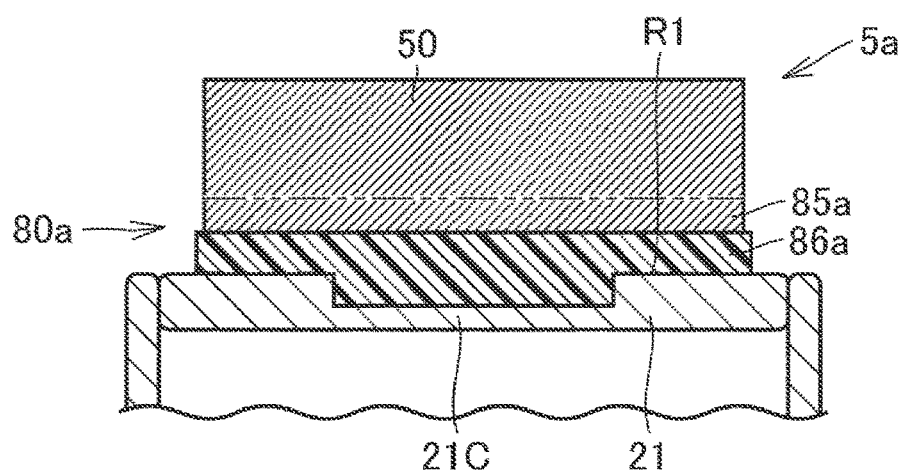
FIG. 13 is a partial sectional view of the housing portion and the lid portion with a jig placed thereon in the step of placing a jig in a modification of the method for manufacturing a cell according to the embodiment.

The jig 5 is not limited to the shape described above. For example, FIG. 13 is a partial sectional view of the housing portion and the lid portion with the jig placed thereon in the step of placing a jig in a modification of the method for manufacturing the cell 1 according to the embodiment. In FIG. 13, the housing portion and the lid portion with the jig placed thereon are shown in section similar to that of FIG. 11.

As shown in FIG. 13, a third protruding portion 80*a* of a jig 5*a* in this modification has a non-abutting portion 85*a* and an abutting portion 86*a* located on the opposite side of the non-abutting portion 85*a* from the base portion 50. The abutting portion 86*a* is made of an elastic polymer material. Therefore, the abutting portion 86*a* may be deformed so as to follow the surface shape of the plate portion 21 (and the safety valve 21C) when the jig 5*a* is placed on the plate portion 21. This configuration allows the jig 5*a* to more closely contact the plate portion 21 and thus further improves heat conduction from the inter-terminal region R1 to the jig 5*a*. As a result, a temperature rise of the inter-terminal region R1 can be reduced, and thermal deformation of the inter-terminal region R1 can further be reduced. The above configuration also allows the jig 5*a* to more closely contact the safety valve 21C and thus further improves heat conduction from the safety valve 21C to the jig 5*a*. As a result, a decrease in strength due to a temperature rise of the safety valve 21C can further be reduced.

The embodiment disclosed herein should be construed as illustrative and not restrictive in all respects. The scope of the disclosure is defined by the claims rather than by the above description, and is intended to include all modifications that fall within the meaning and scope equivalent to those of the claims.

What is claimed is:

1. A method for manufacturing a cell, the method comprising the steps of:
    preparing a housing portion having an opening;
    preparing a lid portion that includes a plate portion, a first external terminal located on the plate portion, and a second external terminal located on the plate portion at a position away from the first external terminal;
    placing the lid portion in the housing portion in such a manner that the plate portion closes the opening;
    placing a jig on an inter-terminal region of the plate portion that is located between the first external terminal and the second external terminal; and
    sealing the opening by joining the plate portion with the jig placed thereon and the housing portion together by welding,
    wherein in the step of placing the jig, the jig is placed so as to abut on each of the first external terminal and the second external terminal,
    wherein in the step of preparing the lid portion,
        the lid portion that is prepared further includes a first resin member provided so as to electrically insulate the plate portion and the first external terminal from each other, and a second resin member provided so as to electrically insulate the plate portion and the second external terminal from each other,
        the first external terminal includes a first side surface facing the second external terminal side,
        the first resin member includes a first outer edge portion located at least on the second external terminal side with respect to the first side surface,
        the second external terminal includes a second side surface facing the first external terminal side, and
        the second resin member includes a second outer edge portion located at least on the first external terminal side with respect to the second side surface; and
    wherein in the step of placing the jig,
        the jig includes a base portion, a first protruding portion protruding from the base portion, a second protruding portion protruding from the base portion on an opposite side from the first protruding portion, and a third protruding portion protruding from a part of the base portion that is different from the first protruding portion and the second protruding portion, and
        the jig is placed in such a manner that the first protruding portion abuts on the first side surface, the second protruding portion abuts on the second side surface, and the third protruding portion contacts the inter-terminal region while being separated from each of the first outer edge portion and the second outer edge portion.

2. The method according to claim 1, wherein:
    in the step of preparing the lid portion, the lid portion that is prepared includes the plate portion further including a liquid injection port; and
    in the step of placing the jig, the jig is placed so as to close the liquid injection port.

3. The method according to claim 1, wherein in the step of placing the jig, the jig is placed so as to be located away from a boundary between the plate portion and the housing portion.

* * * * *